US010226964B2

(12) United States Patent
Rucchetto

(10) Patent No.: US 10,226,964 B2
(45) Date of Patent: Mar. 12, 2019

(54) TIRE JACK AND TROLLEY

(71) Applicant: Anna Rucchetto, Caledon (CA)

(72) Inventor: Anna Rucchetto, Caledon (CA)

( * ) Notice: Subject to any disclaimer, the term of this patent is extended or adjusted under 35 U.S.C. 154(b) by 155 days.

(21) Appl. No.: 15/258,184

(22) Filed: Sep. 7, 2016

(65) Prior Publication Data
US 2017/0066286 A1 Mar. 9, 2017

Related U.S. Application Data

(60) Provisional application No. 62/215,349, filed on Sep. 8, 2015.

(51) Int. Cl.
| | |
|---|---|
| *B60B 29/00* | (2006.01) |
| *B60B 30/02* | (2006.01) |
| *B60B 30/10* | (2006.01) |
| *B21D 39/00* | (2006.01) |

(52) U.S. Cl.
CPC .......... *B60B 29/001* (2013.01); *B60B 29/002* (2013.01); *B60B 30/02* (2013.01); *B60B 30/10* (2013.01); *B60B 29/003* (2013.01); *B62B 2202/031* (2013.01); *Y10T 29/49492* (2015.01); *Y10T 29/49902* (2015.01)

(58) Field of Classification Search
CPC ... B60B 29/001; B60B 29/002; B60B 29/003; B60B 29/005; B60B 30/02; B60B 30/10; B21D 39/00; Y10T 29/49492; Y10T 29/49902
See application file for complete search history.

(56) References Cited

U.S. PATENT DOCUMENTS

| | | | | |
|---|---|---|---|---|
| 5,176,487 A | * | 1/1993 | Flitton | B60B 29/002 254/131 |
| 2005/0200091 A1 | * | 9/2005 | Mitchell | B60B 29/001 280/79.4 |
| 2007/0182115 A1 | * | 8/2007 | Groomes | B60B 29/002 280/79.4 |
| 2007/0286713 A1 | * | 12/2007 | Giese | B60B 29/002 414/427 |
| 2008/0101898 A1 | * | 5/2008 | Hernandez | B60B 29/002 414/426 |
| 2008/0193264 A1 | * | 8/2008 | Snook | B60B 29/001 414/427 |
| 2008/0273954 A1 | * | 11/2008 | Kroeg | B60B 29/002 414/428 |

(Continued)

*Primary Examiner* — Jermie Cozart

(57) ABSTRACT

In one embodiment, there is provided an apparatus for retaining and moving an automobile tire, and which includes a pair of tire engagement roller assemblies and a lever actuator assembly coupled to the roller assemblies. The roller assembly includes a movable base frame and a tire engaging roller rotatably coupled to the base frame, and the lever actuator assembly includes a lever arm, a link arm pivotally coupled to the lever arm along a length thereof, and a retention bar for selectively holding the lever and link arms in a fixed position relative to each other. Longitudinal end portions of the lever and link arms are rotatably coupled to associated said roller assemblies. Rotational movement of the lever arm towards a generally upright position effects inward movement of the roller assemblies towards each other to mount the tire disposed therebetween.

22 Claims, 14 Drawing Sheets

(56) References Cited

U.S. PATENT DOCUMENTS

| | | | |
|---|---|---|---|
| 2009/0123258 A1* | 5/2009 | Campbell | B60B 29/001 414/428 |
| 2012/0241392 A1* | 9/2012 | Combs | B60B 29/001 211/21 |
| 2015/0290972 A1* | 10/2015 | Minor | B60B 29/001 254/4 B |

* cited by examiner

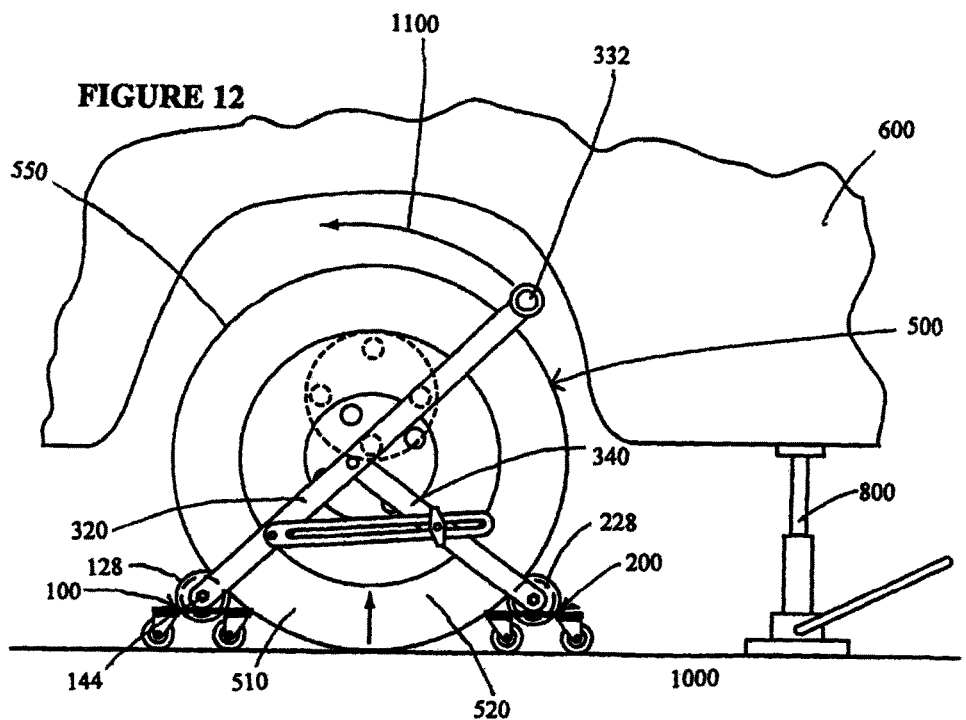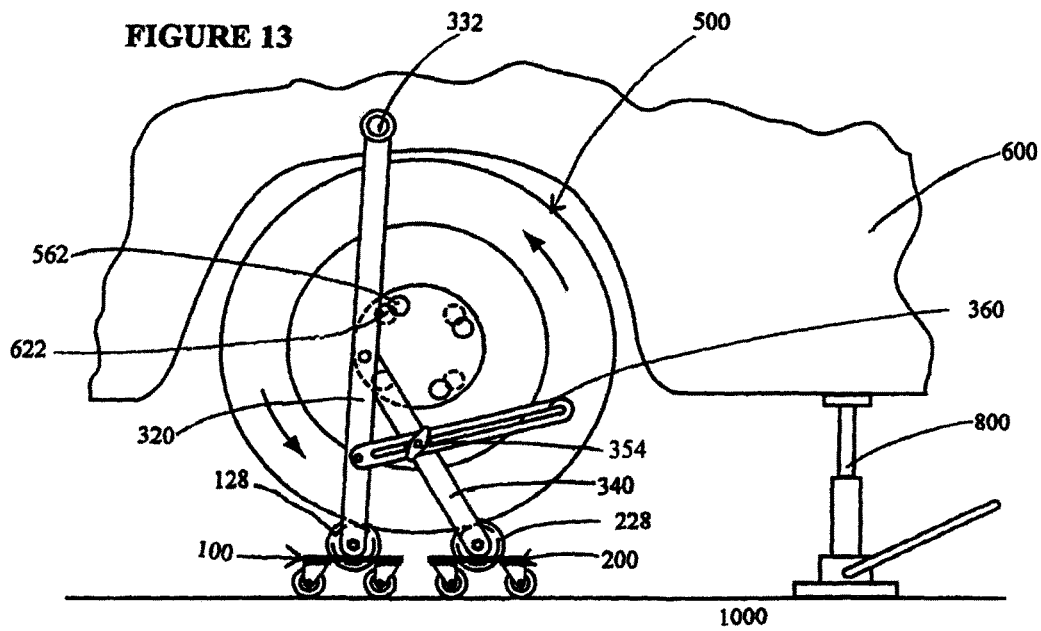

TIRE JACK AND TROLLEY

RELATED APPLICATION

This application claims the benefit under 35 USC 119(e) to U.S. Provisional Application No. 62/215,349 filed Sep. 8, 2015.

SCOPE OF THE INVENTION

This invention relates to an apparatus for mounting and moving an automobile tire, most preferably from or to an automobile, and which is provided with a pair of tire engagement assemblies for mounting the tire thereon and an actuator assembly, preferably a lever actuator assembly, coupled to the tire engagement assemblies for effecting relative movement thereof towards each other.

BACKGROUND OF THE INVENTION

A commercially available automobile or a car (referred hereinafter as "automobile") is a self-powered motor vehicle designed for operation on ordinary roads, and is typically provided with four wheels having tires fitted thereon. The vehicle propulsion is to date commonly provided by an engine or motor, such as an internal combustion engine, an electric motor or a combination thereof. The power generated by the engine or motor is transmitted to rotate the four wheels and thus the tires in contact with the road, thereby moving the automobile in a direction on the road.

The automobile wheels, such as alloy wheels or steel wheels, are circular components which rotate on axles or axle shafts, such as drive axles, dead axles and transaxles, and which are provided with a rim constituting an outer edge of the wheel for holding the tire thereon and a disk radially extending inwardly from the rim to form a center hub. The center hub typically includes multiple holes around the wheel center for receiving associated wheel studs, and the rim a pair of opposed rim flanges for retaining the tire therebetween. To connect the wheel to the axle, the axle is ordinarily provided with a wheel hub or a wheel bearing hub having a number of externally threaded wheel studs, and the wheel is positioned such that an interior surface of the center hub is in at least partial contact with an exterior surface of the wheel hub, and the wheel studs are received through associated holes in the center hub. The wheel studs are threadably received in internally threaded lug nuts or wheel nuts (referred hereinafter as "lug nuts") to thereby securely placing the wheel on the axle. With the tire secured around the wheel between the rim flanges, the tire functions to provide traction between the automobile and the road in propelling the automobile, as well as to provide a flexible cushion to absorb shock when for example travelling over an uneven surface on the road. Typically, the wheel and the tire are sold to end customers with the tire installed or placed on the rim of the wheel.

In the operation of the automobile, damages may occur to the wheel and/or the tire, such as a puncture to the tire leading to a loss of tire pressure, requiring immediate replacement to continue operation, or the existing tire may be intended for operation in non-winter seasons, and requires replacement for a winter tire in preparation for the winter season. In either case, typically an automobile operator can replace the tire using a car jack. Specifically, the car jack can be utilized to raise a portion of the automobile adjacent to the damaged or non-winter tire, such that the tire is also raised from the ground. The lug nuts are then removed from the wheel studs, the tire and the attached wheel is removed from the associated wheel hub, and the spare or replacement wheel and tire is secured to the wheel hub using the lug nuts. The automobile can then be lowered using the car jack, such that the spare or replacement tire contacts the ground, the car jack is removed, and the automobile can be placed back in operation.

It has been appreciated that given the weight of the wheel and tire which may exceed 10 kg, removing and placing the wheel and tire on the automobile can require significant challenges and potential safety concerns.

SUMMARY OF THE INVENTION

It is a non-limiting object of the present invention to overcome the shortcomings which may be associated with conventional processes or devices for retaining or holding and moving the wheel and tire (hereinafter referred collectively as "automobile tire" or "tire"), and which may permit use in conjunction with a car jack to replace an automobile tire.

It is a further non-limiting object of the present invention to provide an apparatus for retaining and moving an automobile tire, and which may permit operation without necessarily requiring significant physical exertion or effort from the user to replace the tire from an automobile.

It is a further non-limiting object of the present invention to provide an apparatus for retaining and moving an automobile tire, and which may permit use in improved lifting and alignment of the tire with the wheel hub and the wheel studs of an automobile raised from the ground.

In one simplified aspect, the present invention provides an apparatus for retaining and moving an automobile tire having forward and rearward end portions and generally circular interior and exterior lateral surfaces, the apparatus comprising a pair of tire engagement assemblies for mounting the tire thereon and an actuator assembly coupled to the tire engagement assemblies for effecting relative inward movement of the tire engagement assemblies towards each other, wherein each said tire engagement assembly comprises a movable base frame and a tire engagement member coupled to the base frame.

In one aspect, the present invention provides an apparatus for retaining and moving an automobile tire having forward and rearward end portions and generally circular interior and exterior lateral surfaces, the apparatus comprising a pair of tire engagement roller assemblies for mounting the tire thereon and an actuator assembly coupled to the roller assemblies for effecting relative movement thereof towards a mounting arrangement, wherein: each said roller assembly comprises a movable base frame and a tire engaging roller rotatably coupled to the base frame along a generally horizontal rotational axis, the roller comprising first and second axial ends and an outer peripheral surface longitudinally extending between the first and second axial ends for at least partially contacting the tire, wherein the base frame is for positioning on the ground for slidable movement thereon, and wherein the respective rollers of the roller assemblies are oriented generally parallel to each other to define an inward space therebetween, wherein the respective base frames of the roller assemblies are movable on the ground to position the respective rollers proximal to or to contact an associated one of the forward and rearward end portions of the tire, whereby the first axial ends of the rollers are proximal to the exterior lateral surface, and the tire is located in the inward space interposed between the rollers, wherein the actuator assembly is operable to effect the slidable movement of one or both of the base frames inwardly towards each other to thereby mount the tire on the respective rollers in the mounting arrangement.

In another aspect, the present invention provides an apparatus for retaining and moving an automobile tire having forward and rearward end portions and generally circular interior and exterior lateral surfaces, the apparatus comprising a pair of tire engagement roller assemblies for mounting the tire thereon and a lever actuator assembly coupled to the roller assemblies for effecting relative movement thereof towards a mounting arrangement, wherein: each said roller assembly comprises a movable base frame and a tire engaging roller rotatably coupled to the base frame along a generally horizontal rotational axis, the roller comprising first and second axial ends and an outer peripheral surface longitudinally extending between the first and second axial ends for at least partially contacting the tire, wherein the base frame is for positioning on the ground for slidable movement thereon, and wherein the respective rollers of the roller assemblies are oriented generally parallel to each other to define an inward space therebetween, and the lever actuator assembly comprises a lever arm, a link arm pivotally coupled to the lever arm, and a retention bar for selectively holding the lever arm and the link arm in the mounting arrangement, wherein the lever arm comprises first and second longitudinal lever end portions, and the link arm comprises first and second longitudinal link end portions, each said first lever and link end portions being pivotally coupled to an associated one of the roller assemblies proximal to the first axial end of the respective roller for pivoting movement along a pivoting axis oriented generally parallel to the horizontal rotational axis, and the second link end portion being pivotally coupled to the lever arm at a linking location between the first and second lever end portions, and wherein the retention bar is removably or movably coupled to the lever arm between the linking location and the first lever end portion, and the link arm between the first and second link end portions, wherein the respective base frames of the roller assemblies are movable on the ground to position the respective rollers proximal to or to contact an associated one of the forward and rearward end portions of the tire, whereby the first axial ends of the rollers are proximal to the exterior lateral surface, and the tire is located in the inward space interposed between the rollers, wherein pivoting movement of the lever arm about the second lever end portion towards a generally upright orientation effects the slidable movement of one or both of the base frames inwardly towards each other to thereby mount the tire on the respective rollers in the mounting arrangement.

In yet another aspect, the present invention provides an apparatus for retaining and moving an automobile tire having forward and rearward end portions and generally circular interior and exterior lateral surfaces, the apparatus comprising a pair of tire engagement roller assemblies for mounting the tire thereon and a lever actuator assembly coupled to the roller assemblies for effecting relative movement thereof towards a mounting arrangement, wherein: each said roller assembly comprises a movable base frame and a tire engaging roller rotatably coupled to the base frame along a generally horizontal rotational axis, the roller comprising first and second axial ends and an outer peripheral surface longitudinally extending between the first and second axial ends for at least partially contacting the tire, wherein the base frame is for positioning on the ground for slidable movement thereon, and wherein the respective rollers of the roller assemblies are oriented generally parallel to each other to define an inward space therebetween, and the lever actuator assembly comprises a lever arm, a link arm pivotally coupled to the lever arm, and a retention bar for selectively holding the lever arm and the link arm in the mounting arrangement, wherein the lever arm comprises first and second longitudinal lever end portions, and the link arm comprises first and second longitudinal link end portions, each said first lever and link end portions being pivotally coupled to an associated one of the roller assemblies proximal to the first axial end of the respective roller for pivoting movement along a pivoting axis oriented generally parallel to the horizontal rotational axis, and the second link end portion being pivotally coupled to the lever arm at a linking location between the first and second lever end portions, wherein the respective base frames of the roller assemblies are movable on the ground to position the respective rollers proximal to or to contact an associated one of the forward and rearward end portions of the tire, whereby the first axial ends of the rollers are proximal to the exterior lateral surface, and the tire is located in the inward space interposed between the rollers, wherein pivoting movement of the lever arm about the second lever end portion towards a generally upright orientation effects the slidable movement of one or both of the base frames inwardly towards each other to thereby mount the tire on the respective rollers in the mounting arrangement.

In yet another aspect, the present invention provides a process for attaching an automobile tire to an automobile, the automobile having a wheel hub provided with a lateral wheel contact surface and a plurality of wheel studs extending laterally outwardly from the surface, and the tire having forward and rearward end portions and generally circular interior and exterior lateral surfaces; wherein the tire defines a plurality of wheel stud holes for receiving the associated wheel studs therethrough, and wherein the process comprises: providing the apparatus of the present invention and the tire on the ground; moving the respective base frames of the roller assemblies on the ground to position the respective rollers proximal to or to contact an associated one of the forward and rearward end portions of the tire, whereby the first axial ends of the rollers are proximal to the exterior lateral surface, and the tire is located in the inward space between the rollers; pivoting the lever arm about the second lever end portion towards the generally upright orientation to effect the slidable movement of one or both of the base frames inwardly towards each other, thereby wedgingly displacing the tire located in the inward space upwardly from the ground onto the respective rollers; moving the apparatus and the tire mounted on the rollers adjacent to the automobile and proximal to the wheel hub, and rotating the tire on the rollers to align the wheel stud holes of the tire with the wheel studs of the automobile; and further moving the apparatus and the tire mounted on the rollers to receive the wheel studs through the wheel stud holes, and to at least partially contact the interior lateral surface of the tire with the wheel contact surface of the wheel hub, and threadably engaging lug nuts to the wheel studs to thereby secure the tire to the automobile.

In one embodiment, the base frame comprises a transverse frame bar and a pair of lateral frame bars each extending from an associated axial end portion of the transverse frame bar in a substantially normal orientation thereto towards the inward space, the base frame further comprising a pair of generally upwardly extending roller retention brackets coupled to an associated one of the lateral frame bars for rotatably mounting the tire engaging roller therebetween. In one embodiment, the base frame further includes a second transverse frame bar having a pair of opposed axial ends coupled to associated inward ends of the lateral frame bars, the second transverse frame bar being oriented substantially parallel to the transverse frame bar, thereby cooperatively with the transverse frame bar and the lateral frame bars forming a generally rectangular base frame defining an inner rectangular slot. Preferably, the second transverse frame bar is recessed into the inner rectangular slot to prevent contact with the forward or rearward end portion of the tire in the slidable movement of the base frame towards the mounting arrangement. In an alternative embodiment, the roller retention brackets extend generally inwardly from the associated lateral frame bars towards the inward space.

It is to be appreciated that rotatably coupling the tire engaging roller to the base frame is not particularly limited. In one embodiment, the tire engaging roller defines an axially open roller pin receiving bore in general alignment with the rotational axis, and each said roller retention bracket defines a roller pin receiving aperture, the tire engagement roller assembly further comprising a roller pin received through the bore and the aperture, wherein the roller pin comprises a mating end portion positioned to extend further laterally outwardly from one said bracket located proximal to the first axial end of the roller, and the first lever and link end portions each define a mating end receiving opening, the mating end portion being received through the mating end receiving opening, whereby one said bracket located proximal to the first axial end is interposed between the first axial end and the first lever or link end portion. In an alternative embodiment, the roller pin is not provided with any mating end portion, and rather, the roller retention bracket located proximal to the first axial end is provided with the mating end portion, wherein the mating end portion is aligned with or offset from the rotational axis. In a further alternative embodiment, the mating end portion is coupled to one said lateral frame bar located proximal to the first axial end.

In an alternative embodiment, rather than including the roller pin with the roller assembly and the roller defining the roller pin receiving bore, the roller comprises a pair of axially extending projections in general alignment with the rotational axis, the projections being sized to be received in associated projection receiving apertures defined by the roller retention brackets.

It is to be appreciated that the movable base frame is not particularly limited, provided that the base frame is operable to permit slidable movement on the ground. In one embodiment, the tire engagement roller assembly further comprises a plurality of casters secured to the base frame for effecting the slidable movement thereof on the ground. In an alternative embodiment, the tire engagement roller assembly further comprises a plurality of omni wheels or Mecanum wheels secured to the base frame for effecting the slidable movement thereof on the ground.

In one embodiment, the tire engaging roller comprises a pair of axially disposed tire stop radial flanges each extending outwardly from the outer peripheral surface to impede lateral movement of the automobile tire off the roller. In one embodiment, the respective tire engaging rollers of the tire engagement roller assemblies each comprise a selectively inflatable tire engaging roller operable to selectively inflate, thereby increasing a diameter of the roller to effect general vertical movement of the automobile tire in the mounting arrangement, and wherein one or both said tire engagement roller assemblies further comprise a roller actuator for selectively rotating the roller, thereby effecting relative rotation and alignment of the tire for attachment to an automobile. In one embodiment, the outer peripheral surface of the roller comprises a rubber material or lining for frictional engagement with a tread area of the tire, wherein in the mounting arrangement, the tire is rotatable on the rollers with counter rotation of the rollers. It is to be appreciated that the outer peripheral surface of the roller may include other materials, such as plastic, wood, ceramic, metal and glass.

It is to be appreciated that the actuator assembly is not particularly limited, provided that the assembly operates to move the tire engagement roller assembly towards each other. For instance, the actuator assembly may include a hydraulic cylinder extending longitudinally between the roller assemblies to effect the relative movement thereof away from or towards each other. In one embodiment, the actuator assembly is preferably a lever actuator assembly comprising a lever arm and a link arm pivotally coupled to the lever arm, wherein the lever arm comprises first and second longitudinal lever end portions, and the link arm comprises first and second longitudinal link end portions, each said first lever and link end portions being pivotally coupled to an associated one of the roller assemblies proximal to the first axial end of the respective roller for pivoting movement along a pivoting axis oriented generally parallel to the horizontal rotational axis, and the second link end portion being pivotally coupled to the lever arm at a linking location between the first and second lever end portions, wherein pivoting movement of the lever arm about the second lever end portion towards a generally upright orientation effects the slidable movement of one or both of the base frames inwardly towards each other to thereby mount the tire on the respective rollers in the mounting arrangement.

In one embodiment, the lever actuator assembly further comprises a retention bar for selectively holding the lever arm and the link arm in the mounting arrangement, the retention bar being removably or movably coupled to the lever arm between the linking location and the first lever end portion, and the link arm between the first and second link end portions. In one embodiment, the retention bar is pivotally coupled to the lever arm, and the lever actuator assembly further comprises a locking bolt coupled to the link arm, the retention bar defining along a length an elongated slot for slidably receiving the locking bolt therethrough, wherein the locking bolt is operable to selectively hold the retention bar at a locking position along the elongated slot, thereby locking the link arm and the lever arm in the mounting arrangement. In one embodiment, the retention bar includes a marking along the elongated slot to indicate a predetermined distance between the roller assemblies based on the locking position.

In one embodiment, the lever arm comprises a foldable lever arm having first and second foldable sections rotatably coupled to each other in an end-to-end orientation, the first and second foldable sections being positioned to respectively form the first and second lever end portions, and the lever actuator assembly further comprises a generally horizontal handle coupled to the second foldable section to extend laterally outwardly therefrom. In one embodiment, the foldable sections may have same or different lengths, and the handle has a length between about 5 cm and about 15 cm or preferably about 10 cm.

The apparatus is envisioned for use with tires intended for a majority of commercially available passenger automobiles, such as sedans, coupes, sport utility vehicles, mini vans and trucks, and which may have a tire diameter ranging from about 45 cm to about 90 cm, and a tire width ranging from 10 cm to about 40 cm. It is to be appreciated that the dimensions of the apparatus and the components thereof are not particularly limited. In one embodiment, a total height of the tire engagement roller assembly is between about 5 cm and about 30 cm, preferably between about 10 cm and about 20 cm or more preferably about 13 cm, and a height ratio of the total height of the roller assembly to a diameter of the tire is between about 0.05 and about 0.4, preferably between about 0.1 and about 0.3, more preferably between about 0.15 and about 0.25 or most preferably about 0.2. In one embodiment, the tire engaging roller has a length between about 15 cm and about 60 cm, preferably between about 20 cm and about 50 cm, more preferably between about 25 cm and about 40 cm or most preferably about 30 cm, and a diameter between about 2 cm and about 20 cm, preferably between about 5 cm and about 10 cm or more preferably about 8 cm. Preferably, the length of the tire engaging roller is greater than a width of the automobile tire.

In one embodiment, the lever arm has a length between about 50 cm and about 120 cm, preferably between about 65 cm and about 115 cm, more preferably between about 75 cm and about 100 cm or most preferably about 80 cm, and the link arm has a length between about 20 cm and about 60 cm, preferably between about 30 cm and about 50 cm or more preferably about 40 cm. In one embodiment, a length ratio between a length of the link arm and the length of the lever arm being between about 0.3 and about 0.7, preferably between about 0.4 and about 0.6, more preferably between about 0.45 and about 0.55 or most preferably about 0.5. In one embodiment, the linking location is spaced from a longitudinal end of the lever arm proximal to the first lever end portion between about 20 cm and about 50 cm, preferably between about 25 cm and about 40 cm or more preferably about 30 cm. In one embodiment, the linking location is proximal to the first link end portion, and the linking location is located between about 20% and about 60%, preferably between about 30% and 50% or more preferably about 40% of the length of the lever arm. In one embodiment, the retention bar has a length between about 10 cm and 50 cm, preferably between about 20 cm and about 40 cm or more preferably about 30 cm.

It is to be appreciated that the apparatus of the present invention may permit uses to remove the tire from the automobile, or attaching the tire to the wheel hub. In the former, once the roller assemblies are placed beneath the tire with for example the automobile raised on a car jack or a car lift, the pivoting movement of the lever arm about the second lever end portion towards the generally upright orientation effects the slidable movement of one or both of the base frames inwardly towards each other to thereby contact and engage an associated one of the forward and rearward end portions of the tire. After removal of the lug nuts, the apparatus and the tire mounted on the rollers may be moved laterally outwardly from the automobile to remove the tire therefrom.

To attach the tire to the wheel hub, the tire to be attached is first placed on the ground with the tread area in contact therewith. After the tire on the ground is placed in the inward space between the tire engaging rollers, in one embodiment the pivoting movement of the lever arm about the second lever end portion towards the generally upright orientation effects the slidable movement of one or both of the base frames inwardly towards each other to thereby wedgingly displace the tire located in the inward space upwardly from the ground onto the respective rollers, thereby mounting the tire on the rollers. The apparatus and the tire mounted on the rollers may thereafter be moved to the automobile, and the tire can be rotated for alignment with the wheel studs, and secured to the wheel hub.

BRIEF DESCRIPTION OF THE DRAWINGS

Reference may now be had to the following detailed description taken together with the accompanying drawings in which:

FIG. 12 is a partial side view of the automobile, the replacement automobile tire and the apparatus shown in FIGS. 1 and 10, and which shows the apparatus in operational engagement with the replacement automobile tire and a wheel hub in phantom;

FIG. 13 is another partial side view of the automobile, the replacement automobile tire and the apparatus shown in FIGS. 1 and 10, and which shows the apparatus with the replacement automobile tire mounted thereon and a wheel hub in phantom;

DETAILED DESCRIPTION OF THE PREFERRED EMBODIMENTS

Figure 1:
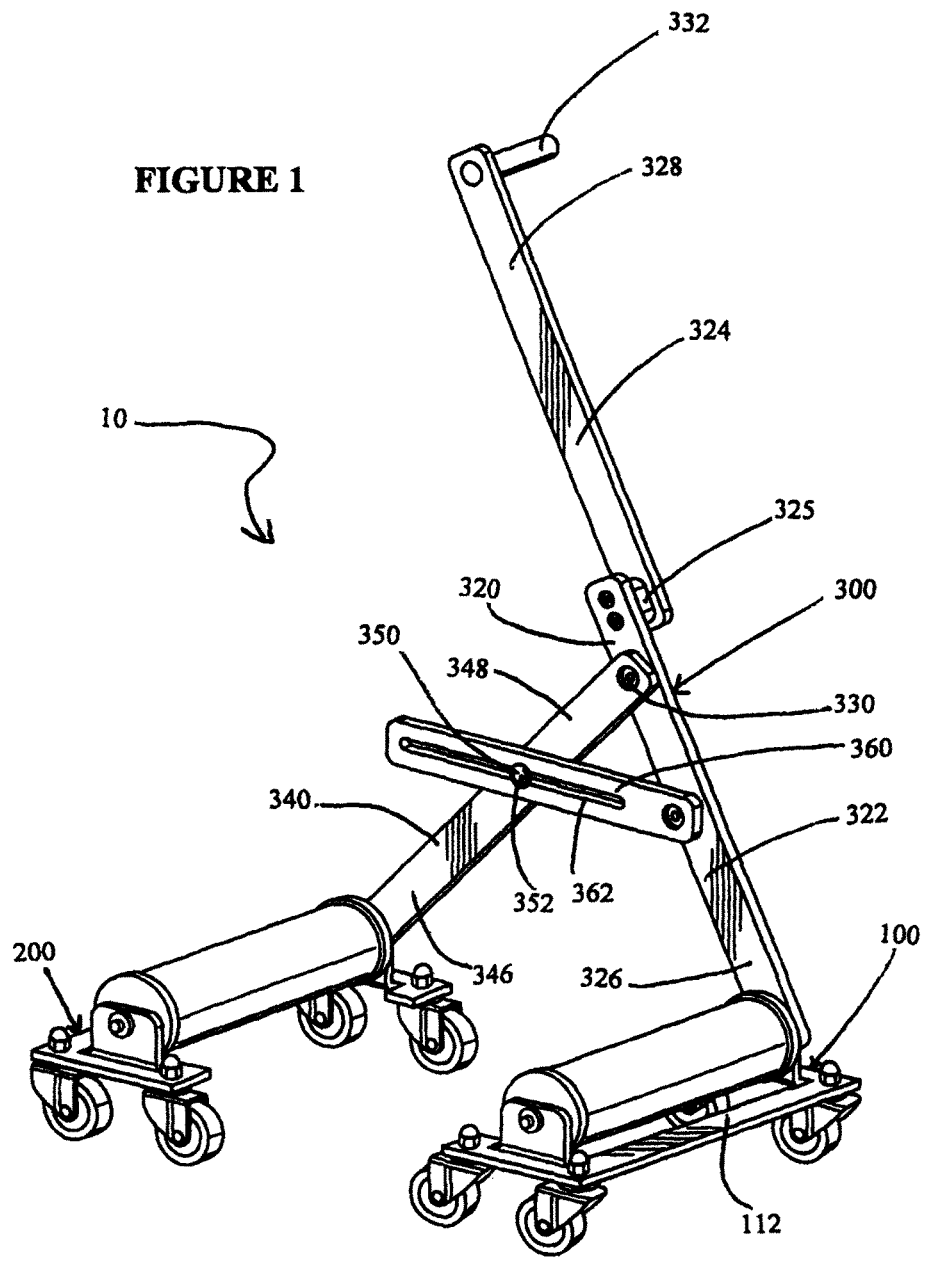
FIG. 1 is a perspective view of an apparatus in accordance with a preferred embodiment of the present invention.

Reference is made to FIG. 1 which shows a perspective view of an apparatus 10 for retaining and moving an automobile tire 500 in accordance with a preferred embodiment of the present invention. In the construction shown, and as will be further detailed below, the apparatus 10 includes a pair of tire engagement roller assemblies 100, 200 and a lever actuator assembly 300 secured to the roller assemblies 100, 200. For more complete and clear illustration of the apparatus 10, the apparatus 10 is shown in isolation, and not in use with the automobile tire mounted thereon or located near an automobile.

Figure 2:
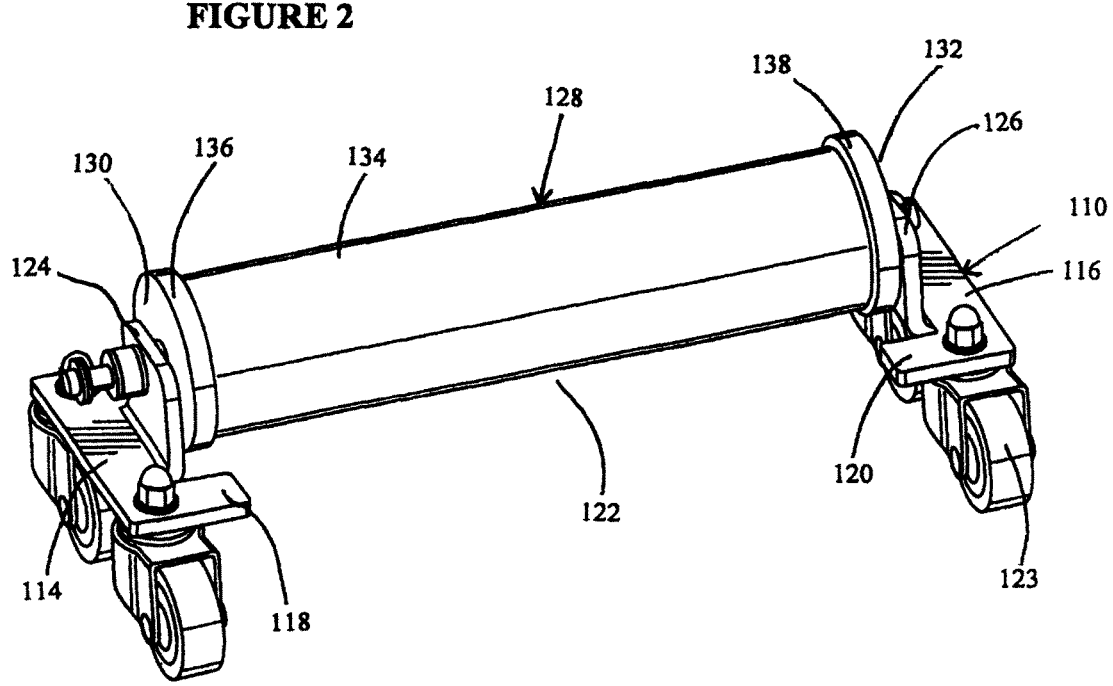
FIG. 2 is a perspective view of a tire engagement roller assembly included with the apparatus shown in FIG. 1, and which is shown in isolation without any other remaining components of the apparatus.

Reference is made to FIG. 2 which shows a perspective view of the tire engagement roller assembly 100 in isolation without the other roller assembly 200 or the lever actuator assembly 300 for more clear illustration. The roller assembly 100 includes a slidable base frame 110 having an elongated transverse frame bar 112 (see in FIG. 1) and a pair of lateral frame bars 114, 116 integrally coupled to associated axial ends of the transverse frame bar 112. As seen in FIGS. 1 and 2, the lateral frame bars 114, 116 extend in a generally normal orientation to the transverse frame bar 112 to form respective transversely extending webs 118, 120 cooperatively defining a tire receiving path 122 therebetween. For operation with a majority of commercially available passenger automobiles, the tire receiving path 122 preferably has a width of about 30 cm. To permit slidable movement of the base frame 110 on the ground as will be further described below, the roller assembly 100 has four (4) casters or caster wheels 123, secured to a bottom surface of the base frame 110. Extending upwardly from inner edges of the lateral frame bars 114, 116 are respective roller retention brackets or bracket plates 124, 126 each defining a roller pin receiving aperture (not shown), and which are for rotatably holding a rubberized tire engaging roller 128 therebetween.

Figure 3:
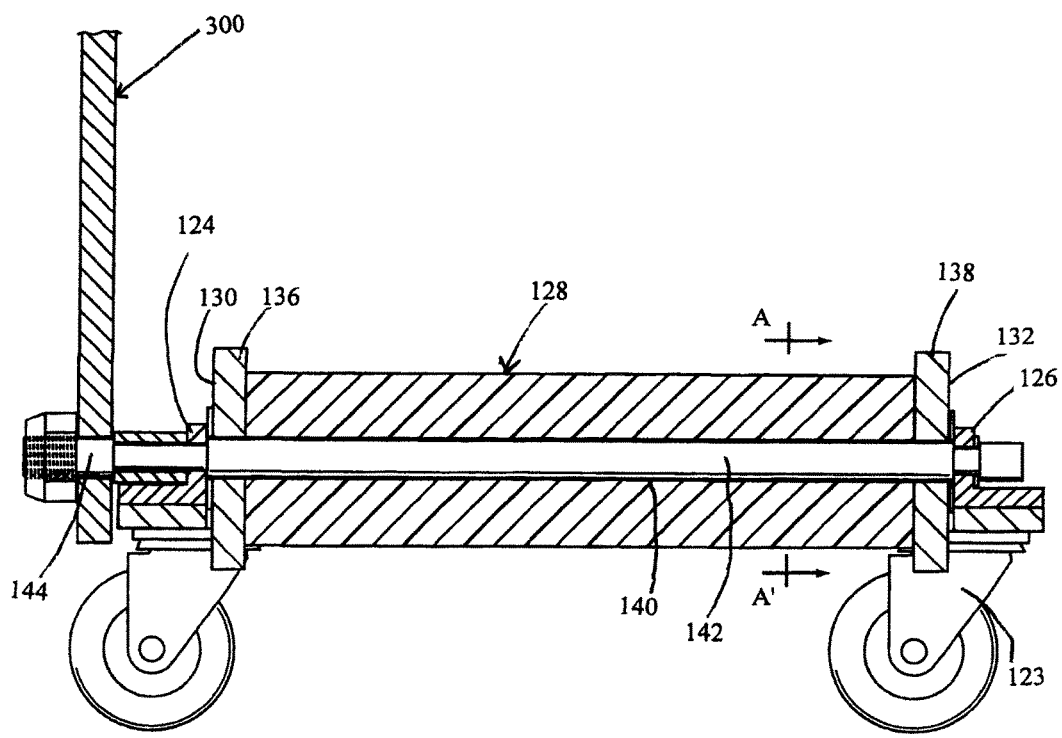
FIG. 3 is a longitudinal cross-sectional view of a tire engaging roller and a roller pin included with the tire engagement roller assembly shown in FIG. 2.
Figure 4:
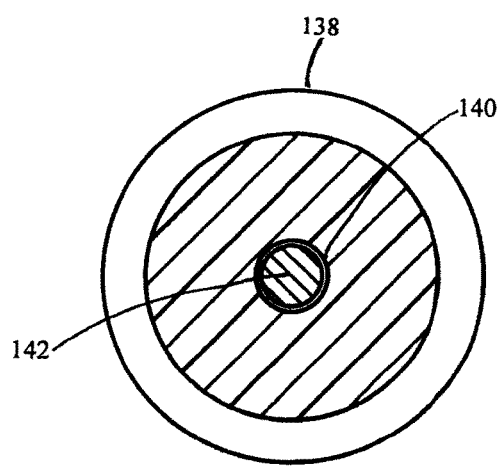
FIG. 4 is an axial cross-sectional view of the tire engaging roller and the roller pin shown in FIG. 3, and which is taken along the plane A-A' shown in FIG. 3.

The roller 128 includes a pair of opposed axial ends 130, 132 and an outer peripheral roller surface 134 extending between the axial ends 130, 132. The roller 128 further includes a pair of tire stop radial flanges 136, 138 extending further radially outwardly from the peripheral surface 134 proximal to the associated axial ends 130, 132 to impede lateral movement of the tire 500 off the roller 128, as will be further described below. As better seen in FIGS. 3 and 4, the roller 128 defines a roller pin receiving bore 140 extending along a length of the roller 128 in alignment with a horizontal rotational axis thereof, and which opens axially through the axial ends 130, 132. For attachment to the base frame 110, the assembly 100 also includes a roller pin 142 received through the bore 140, and the roller pin receiving apertures of the roller retention brackets 124, 126, thereby rotatably coupling the roller 128 therebetween, where the axial ends 130, 132 of the roller 128 are adjacent to inner surfaces of the brackets 124, 126. The roller pin 142 extends further outwardly from the axial end 130 and the adjacent bracket 124 to form a mating end portion 144 to rotatably couple to the lever actuator assembly 300, as will be further described below.

The other roller assembly 200 is substantially a mirror image of the roller assembly 100 with identical but mirrored components thereof.

Figure 5:
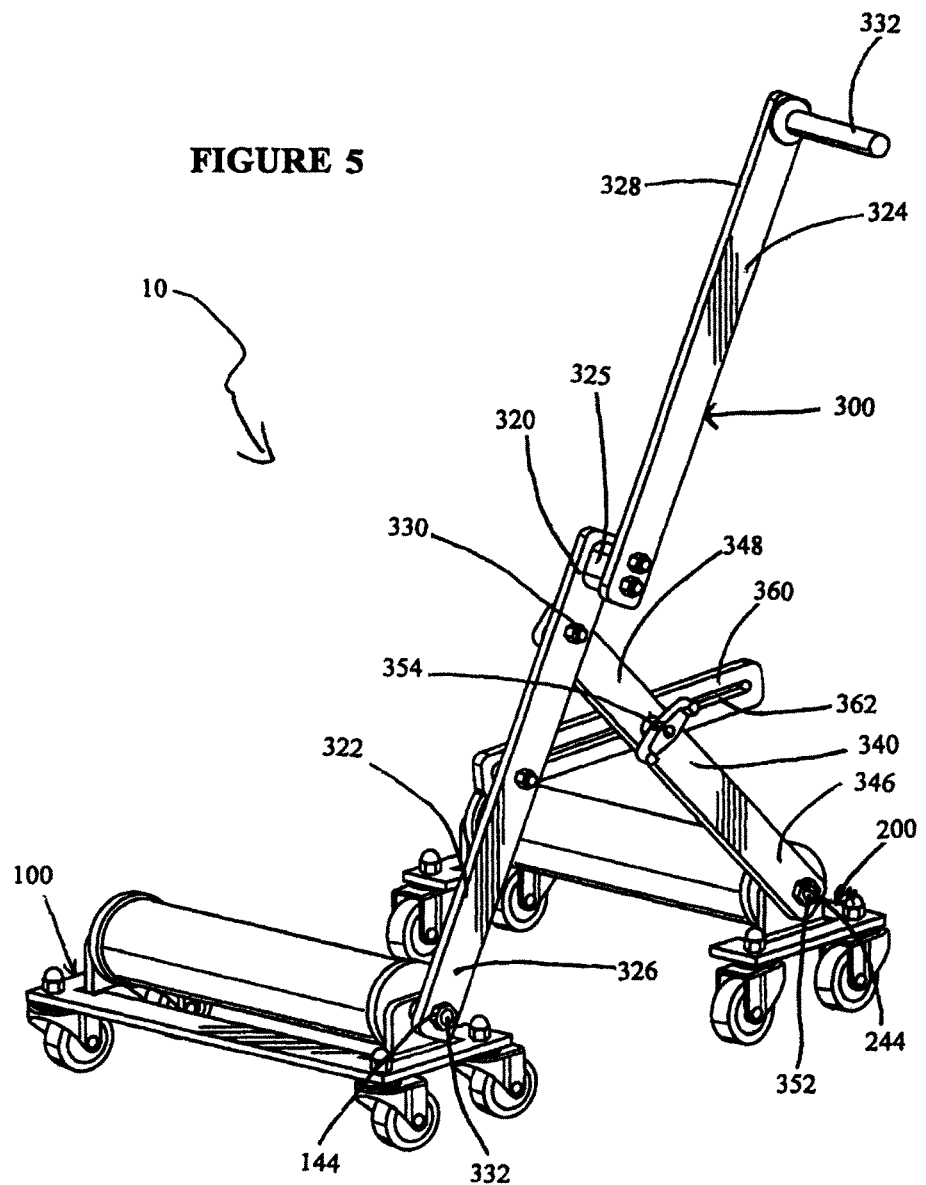
FIG. 5 is another perspective view of the apparatus shown in FIG. 1.

As seen in FIGS. 1 and 5, the lever actuator assembly 300 includes an elongated lever arm 320, a link arm 340 and a retention bar 360. The elongated lever arm 320 is formed with two longitudinal sections 322, 324 coupled to each other with a spacer or spacer web 325 in an end-to-end orientation, and which respectively form first and second longitudinal lever end portions 326, 328. Similarly, the link arm 340 forms first and second longitudinal link end portions 346, 348. The second link end portion 348 is rotatably coupled to the longitudinal section 322 at a linking location 330 between the spacer web 326 and the first lever end portion 326. Both the first lever and link end portions 326, 346 define respective mating end receiving openings 332, 352, and the mating end portions 144, 244 of the roller assemblies 100, 200 are securely received through the openings 332, 352, thereby rotatably coupling the arms 320, 340 to the roller assemblies 100, 200. The longitudinal section 324 of the lever arm 320 has a generally horizontal handle 332 extending from the second lever end portion 328 in a direction opposite to the roller assemblies 100, 200, and which is intended for a user to exert a force to introduce a rotational movement to the lever arm 320, as will be further discussed below.

As seen in FIGS. 1 and 5, the actuator assembly 300 also has the retention bar 360 pivotally coupled at one axial end to the longitudinal section 322 between the linking location 330 and the first lever end portion 326. The retention bar 360 defines an elongated slot 362 extending towards the other axial end, and a threaded locking bolt 350 is received through the slot 362 and the link arm 340. Specifically, the locking bolt 350 includes a locking bolt head 352 having a diameter greater than a width of the elongated slot 362, and an externally threaded locking bolt shank (not shown) coupled to the bolt head 352, and which is received through the slot 362 and an opening (not shown) defined by the link arm 340. The bolt head 352 is adjacent to or in abutting contact with the retention bar 360 around a periphery of the elongated slot 362, and opposed to the bolt head 352 is a lock handle 354 defining an internally threaded bore (not shown) threadably receiving the threaded shank of the locking bolt 350 adjacent to the link arm 340. The locking bolt 350 is operable to hold down the link arm 340 and the retention bar 360 between the bolt head 352 and the lock handle 354 by rotating the lock handle 354, thereby maintaining a fixed angled orientation between the arms 320, 340, as will be further discussed below.

Figure 6:
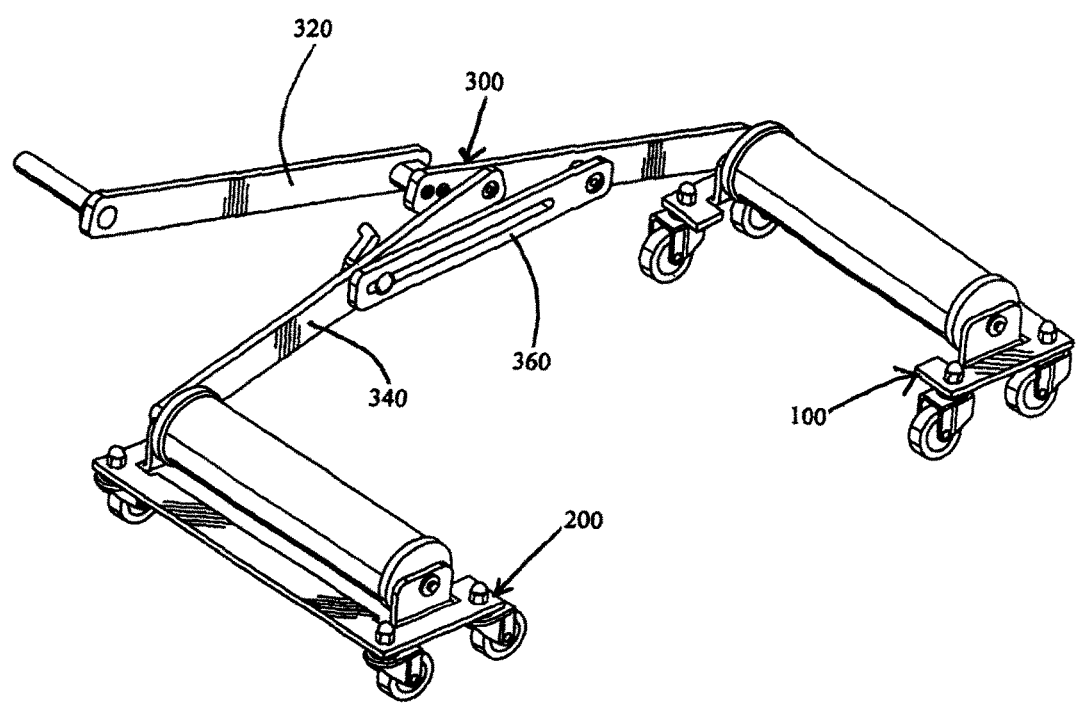
FIG. 6 is another perspective view of the apparatus shown in FIG. 1, and which shows the tire engagement roller assemblies further spaced apart.
Figure 7:
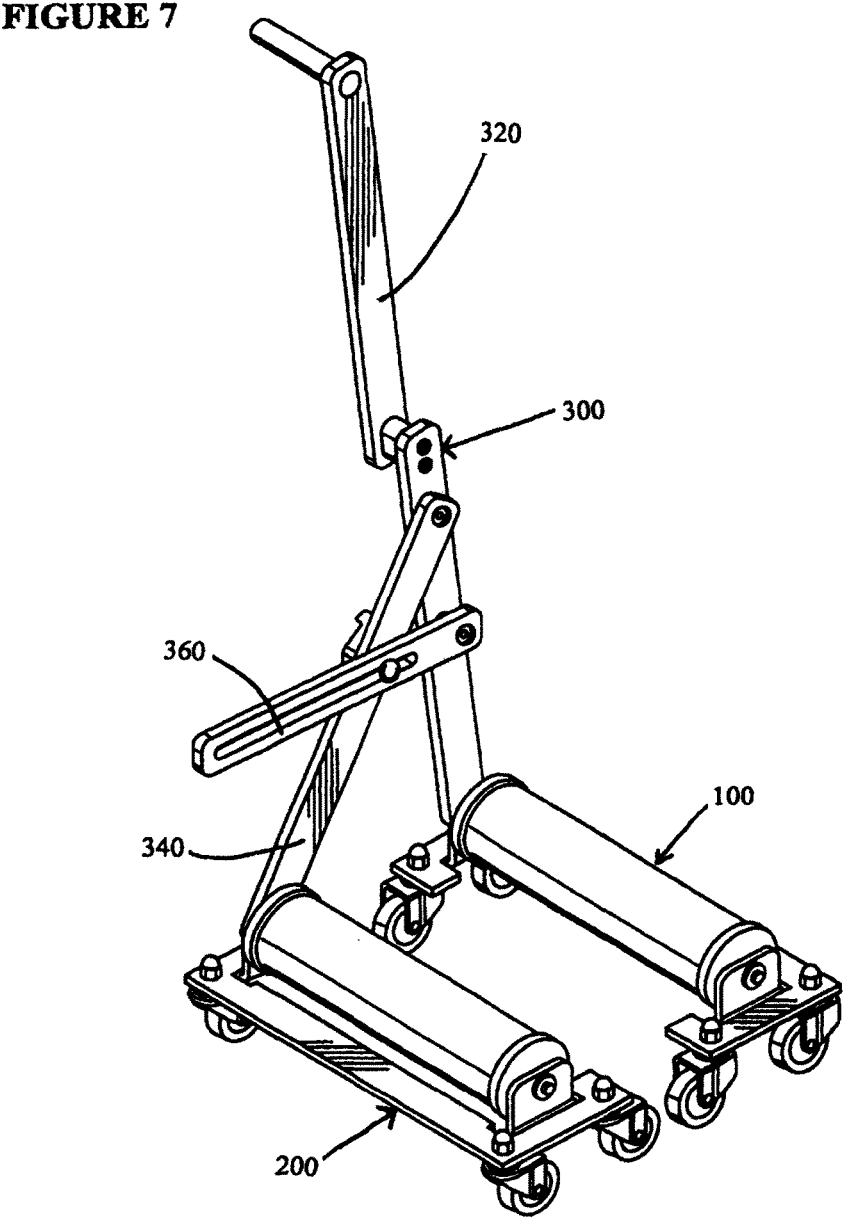
FIG. 7 is another perspective view of the apparatus shown in FIG. 1, and which shows the tire engagement roller assemblies less spaced apart.

As seen in FIGS. 1, 6 and 7, the lever actuator assembly 300 is operable to effect relative movement of the tire engagement roller assemblies 100, 200 inwardly towards each other by applying a force to the handle 332 to cause rotational movement of the lever arm 320 towards a generally upright orientation. The lever actuator assembly 300 is also operable to move the roller assemblies 100, 200 away from each other by applying a force to the handle 332 to cause rotational movement of the lever arm 320 towards a generally horizontal orientation.

Reference is made to FIGS. 8 to 16 which show in sequence side and elevation views of the apparatus 10 in operation to replace a damaged automobile tire 400 of an automobile 600. As first seen in FIG. 8, a portion of the automobile 600 near the damaged tire 400 is raised with a car jack 800, such that the tire 400 no longer contacts the ground 1000. Four (4) lug nuts (not shown) holding the tire 400 in abutting contact against a wheel hub 620 of the automobile 600 by complementary threaded engagement with associated four (4) wheel studs 622 extending outwardly from the wheel hub 620 are removed, and the tire 400 is removed from the hub 620. As next seen in FIG. 9, after removal of the damaged tire 400, the wheel bearing hub 400 and the wheel studs 622 are available to receive a replacement automobile tire 500.

Figure 10:
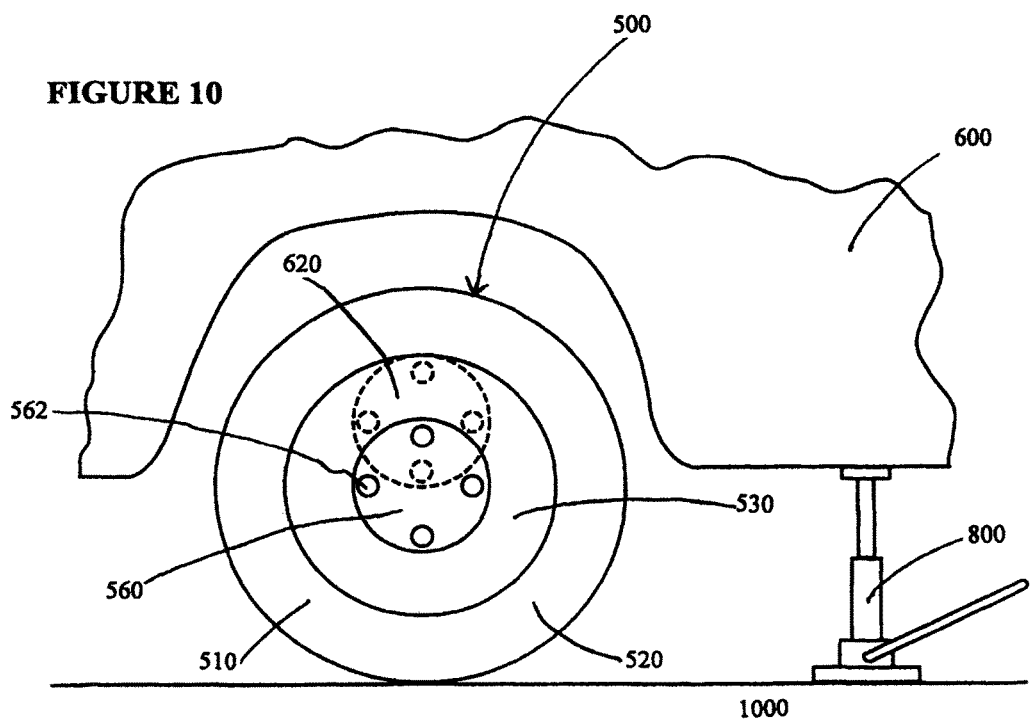
FIG. 10 is a partial side view of the automobile shown in FIG. 8, and which has placed proximal to the automobile a replacement automobile tire and a wheel hub in phantom.
Figure 11:
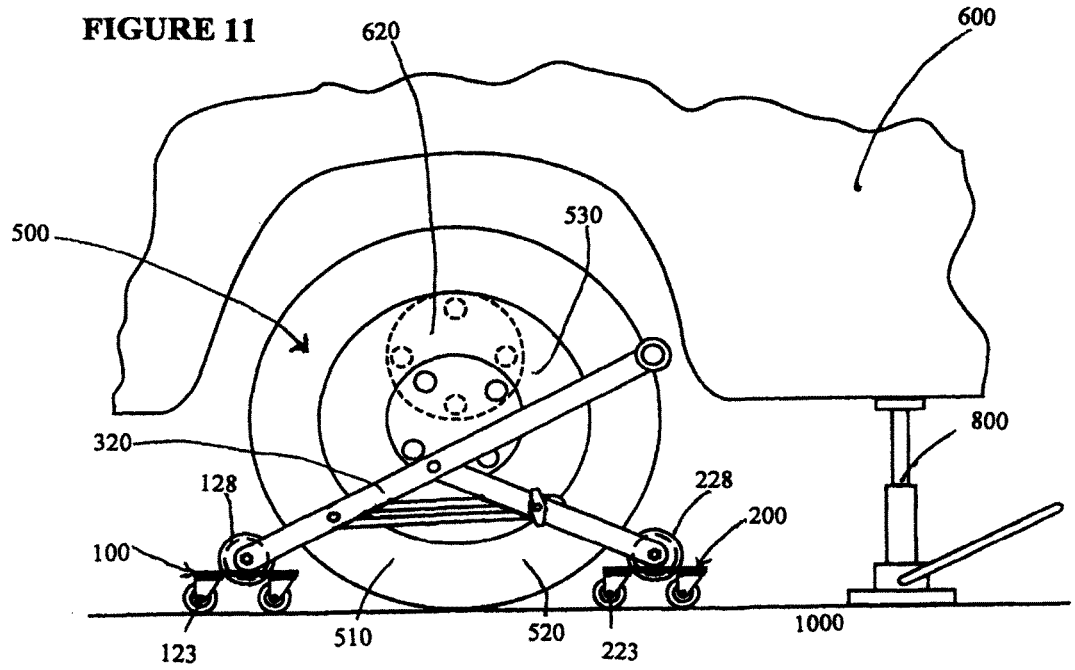
FIG. 11 is a partial side view of the automobile and the replacement automobile tire shown in FIG. 10, and which has the apparatus shown in FIG. 1 positioned around the replacement automobile tire and a wheel hub in phantom.
Figure 15:
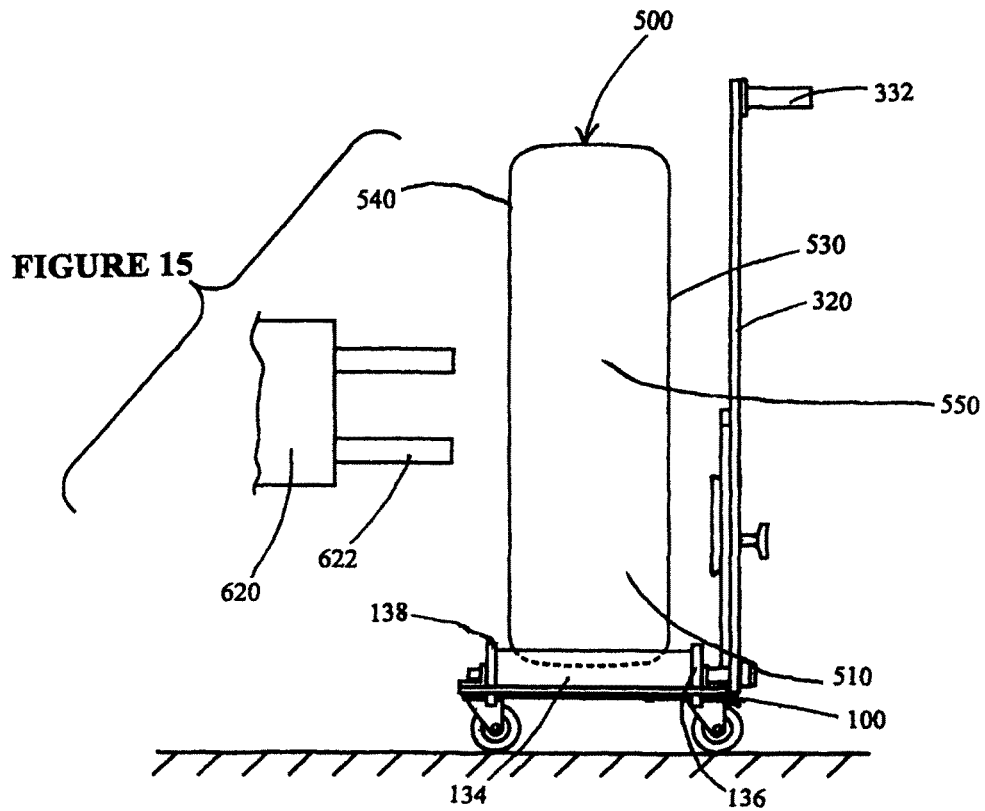
FIG. 15 is an elevation view of the automobile, the replacement automobile tire and the apparatus shown in FIGS. 1 and 10, and which only shows a wheel bearing hub and wheel studs of the automobile proximal to the replacement automobile tire mounted on the apparatus.
Figure 16:
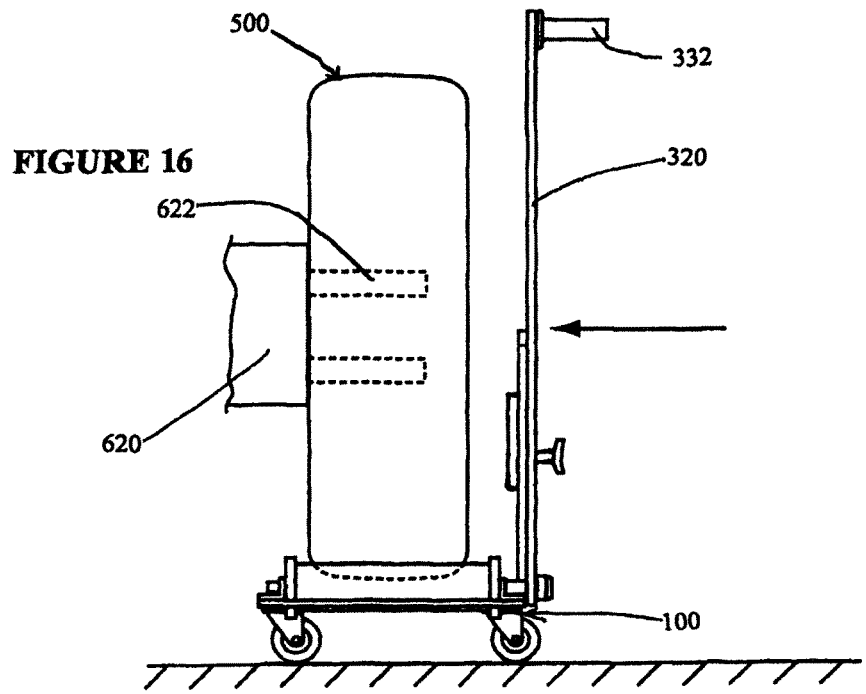
FIG. 16 is an elevation view of the automobile, the replacement automobile tire and the apparatus shown in FIGS. 1 and 10, and which only shows a wheel bearing hub and wheel studs (in phantom) of the automobile in engagement with the replacement automobile tire mounted on the apparatus.

To secure the replacement tire 500 to the automobile 600, as seen in FIG. 10 the replacement tire 500 is obtained and placed near the automobile 600. As seen in FIGS. 10 and 15, the replacement tire 500 has forward and rearward end portions 510, 520, as well as circular exterior and interior lateral surfaces 530, 540, and is provided with an annular tread area 550 and a center hub 560 defining four (4) stud receiving holes 562 for receiving the wheel studs 622, as will be further described below. As seen in FIG. 11, for operation the apparatus 10 is first positioned proximal to the tire 500 with the sliding movement of the tire engagement roller assemblies 100, 200 enabled by the casters 128 of the roller assembly 100, as well the respective casters 228 of the other roller assembly 200. The apparatus 10 is placed around the tire 500, such that the tire 500 is interposed between the roller assemblies 100, 200, and the lever actuator assembly is proximal to the exterior lateral surface 530. Specifically, the forward end portion 510 is positioned adjacent to the exterior peripheral surface 134 and between the tire stop flanges 136, 138 of the tire engaging roller 128 of the roller assembly 100. Likewise, the rearward end portion 520 is positioned adjacent to the respective tire engaging roller 228 of the other roller assembly 200 in a similar orientation near the respective peripheral surface and between the tire stop flanges of the roller 228. To permit sufficient spacing to place the tire 500 between the roller assemblies 100, 200, the lever arm 320 is maintained at a reduced angle relative to the ground, such that an angle between the lever and link arms 320, 340 is increased.

As shown in FIG. 12, to mount the tire 500 onto the roller assemblies 100, 200 the lever arm 320 is rotated towards a generally upright position by applying a force to the handle 332 in a direction 1100. Initially, the rotational movement of the lever arm 320 causes inward movement of the roller assemblies 100, 200 towards each other, until the exterior peripheral surface 134 of the tire engaging roller 128 frictionally engages with the tread area 550 in the forward end portion 510, and that of the tire engaging roller 228 with that in the rearward end portion 520, as seen in FIG. 12. Applying further force to the handle 332 causes a levering action by the lever arm 320 about the mating end portion 144 as the fulcrum point and the link arm 340 as a load, further inwardly moving the roller assemblies 100, 200 towards each other to wedgingly displace the tire 500 upwardly with the rotation of the rollers 128, 228 along the tread area 550, as seen in FIG. 13. It has been appreciated that such levering action by the lever arm 320 may permit for lifting of the tire 500 from the ground with reduce effort from the user.

Figure 14:
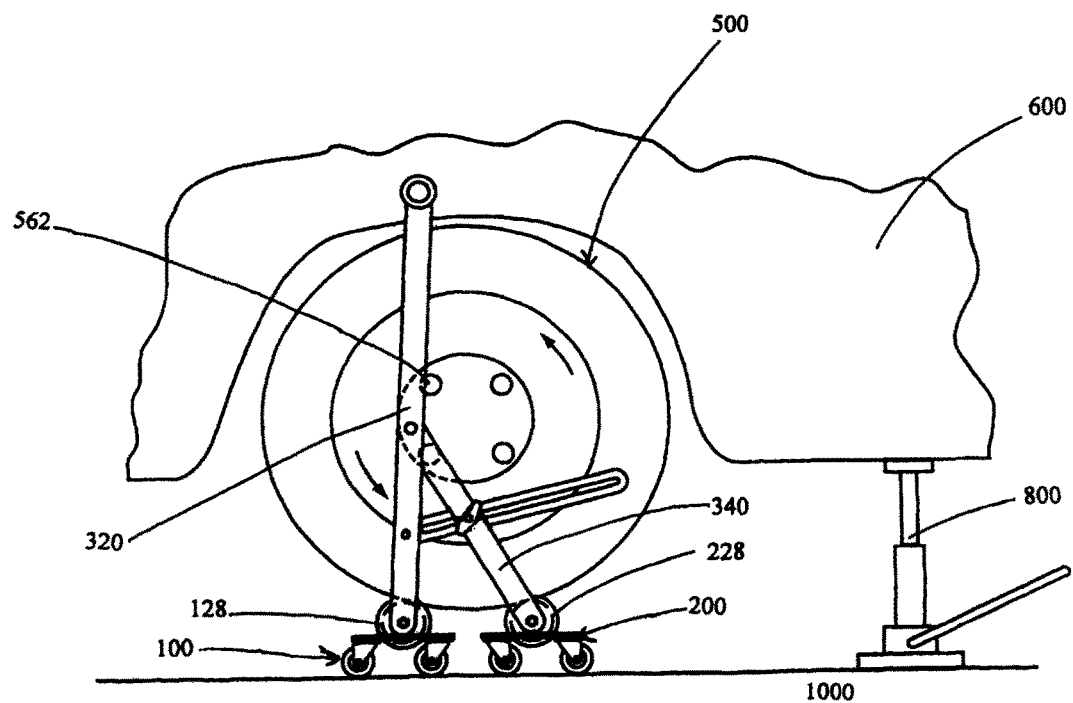
FIG. 14 is another partial side view of the automobile, the replacement automobile tire and the apparatus shown in FIGS. 1 and 10, and which shows the apparatus with the replacement automobile tire mounted thereon for alignment with wheel studs of the automobile.

To maintain the arms 320, 340 in the relative position shown in FIG. 13 with the tire 500 mounted on the roller assemblies 100, 200, a rotation force is applied to the lock handle 354 to further threadably received the locking bolt 350 therein, thereby frictionally engaging the link arm 340 and the retention bar 360 between the bolt head 352 and the lock handle 354. Subsequently, to prepare for attachment to the automobile 600 the tire 500 is rotated with counter rotation of the tire engaging rollers 128, 228 frictionally engaged therewith, until the stud receiving holes 562 of the tire 500 is horizontally aligned with the wheel studs 622 of the automobile 500, as seen in FIG. 14. After alignment, the apparatus 10 is moved towards the automobile 500, until the wheel studs 622 are received in the stud receiving holes 562 as seen in sequence in FIGS. 15 and 16, and the lug nuts are threadably engaged to the wheel studs 622 to secure the tire 500 to the automobile 600.

While the invention has been described with reference to preferred embodiments, the invention is not or intended by the applicant to be so limited. A person skilled in the art would readily recognize and incorporate various modifications, additional elements and/or different combinations of the described components consistent with the scope of the invention as described herein. For instance, it is to be appreciated that while the two longitudinal sections 322, 324 of the lever arm 320 is shown in FIGS. 1 and 5 as being fixedly attached to each other in the end-to-end orientation with the spacer web 326, the spacer web 326 may incorporate a selectively rotatable mechanism to permit folding of the section 324 for more convenient storage and transportation.

Figure 8:
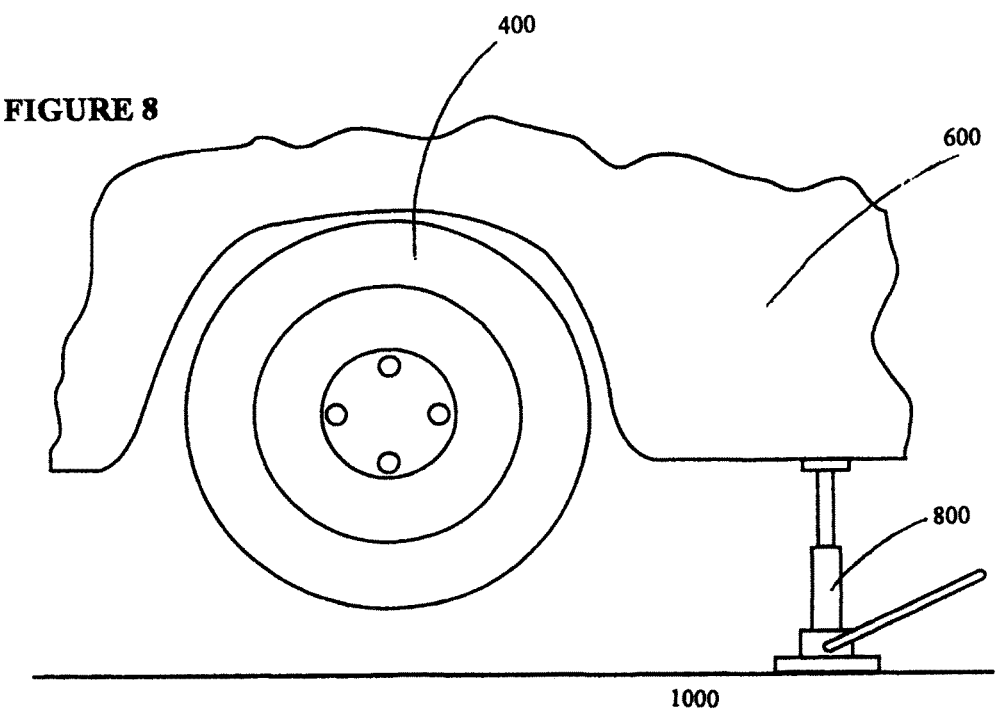
FIG. 8 is a partial side view of an automobile in a raised position with a damaged automobile tire lifted from the ground with a car jack, and which is a subject of operation of the apparatus shown in FIG. 1.
Figure 9:
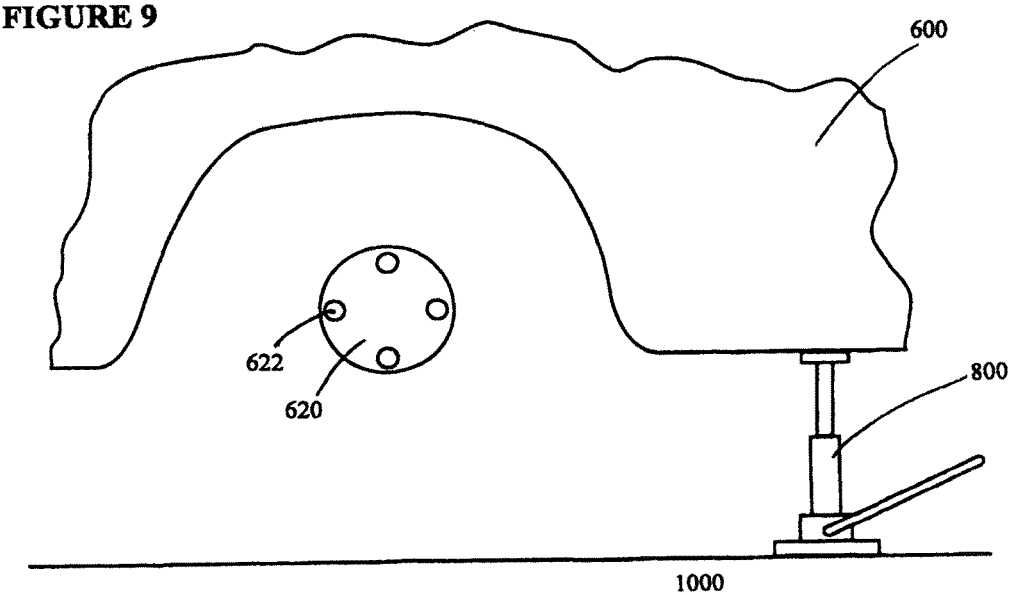
FIG. 9 is a partial side view of the automobile shown in FIG. 8, and which has the damaged automobile tire removed therefrom.

It is to be appreciated that while not explicitly shown in FIGS. 8 and 9, the apparatus 10 may be used dismount the damaged automobile tire 400 from the automobile 600. Operation of the apparatus 10 is substantially identically to that described above with references to FIGS. 11 and 12, with the exception it will only be necessary to apply a force to the handle 332 sufficient to contact the tire 400 with the respective tire engaging rollers 128, 228 of the roller assemblies 100, 200 to mount the tire 400 on the roller assemblies 100, 200. In other words, no further force is applied to the handle 332, as the tire 400 is already raised from the ground, and it is unnecessary to wedgingly displace or lift the tire 400 from the ground above the rollers 128, 228. Once the tire 400 is mounted on the roller assemblies 100, 200, the tire 400 can be removed from the automobile 600 by pulling the apparatus 10 outwardly away from the automobile 600.

Figure 17:
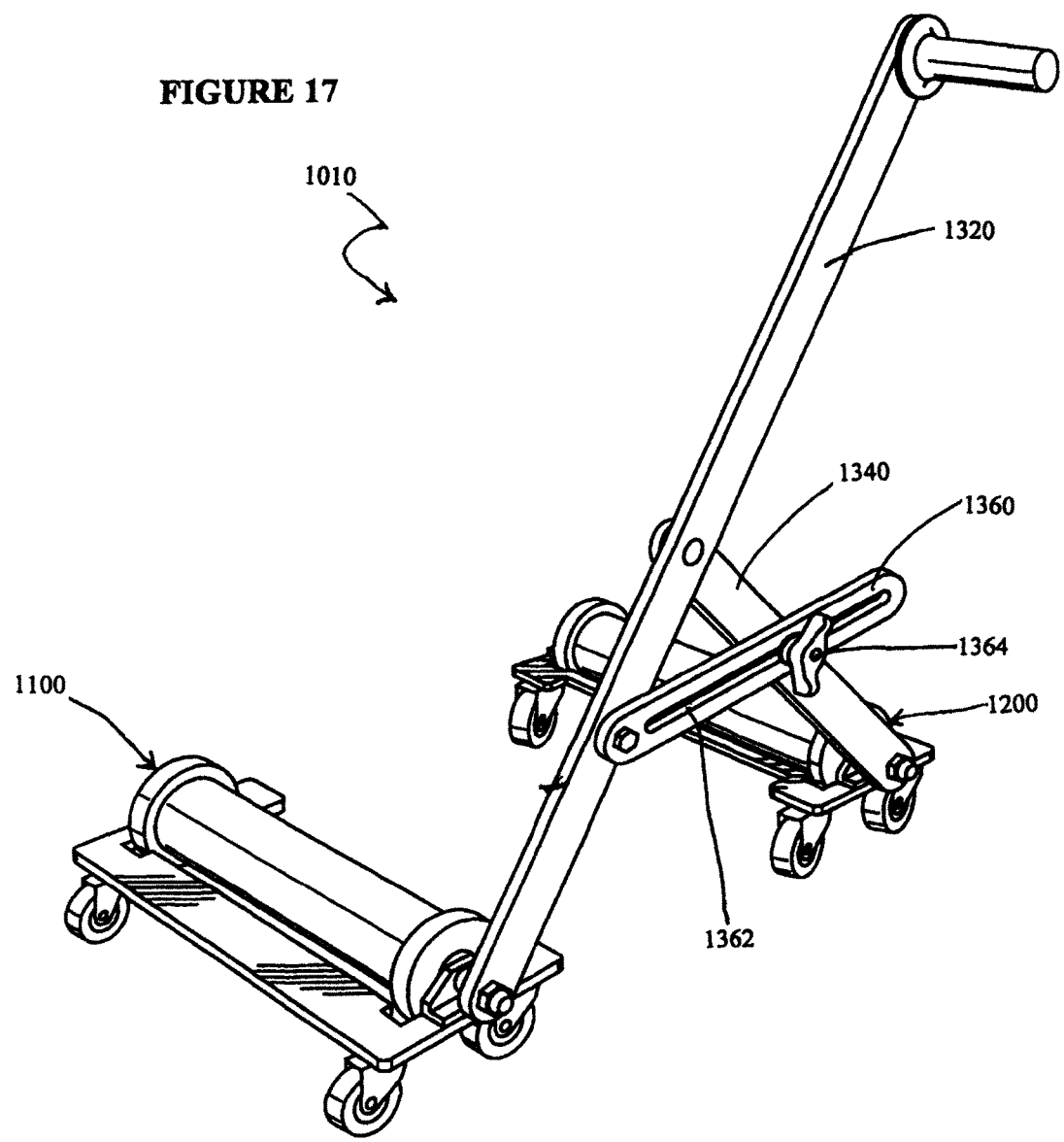
FIG. 17 is a perspective view of an apparatus in accordance with an alternative embodiment of the present invention.
Figure 18:
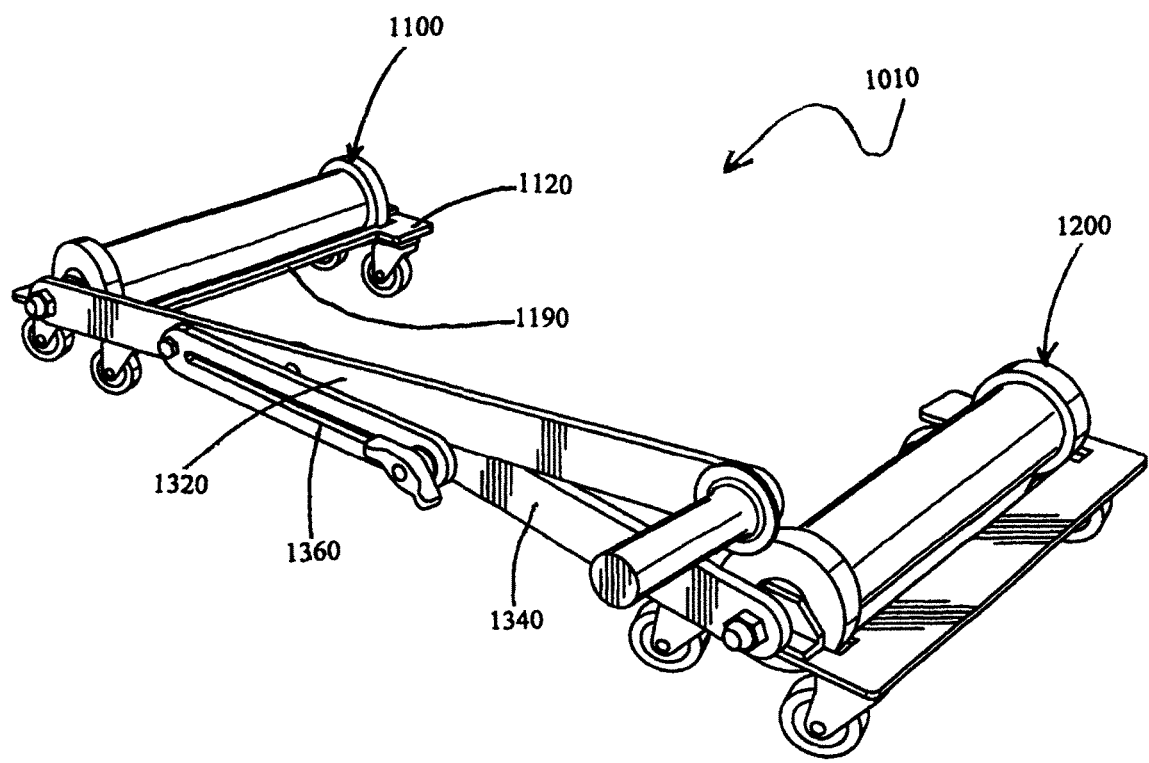
FIG. 18 is another perspective view of the apparatus shown in FIG. 17, and which is shown in an extended orientation.
Figure 19:
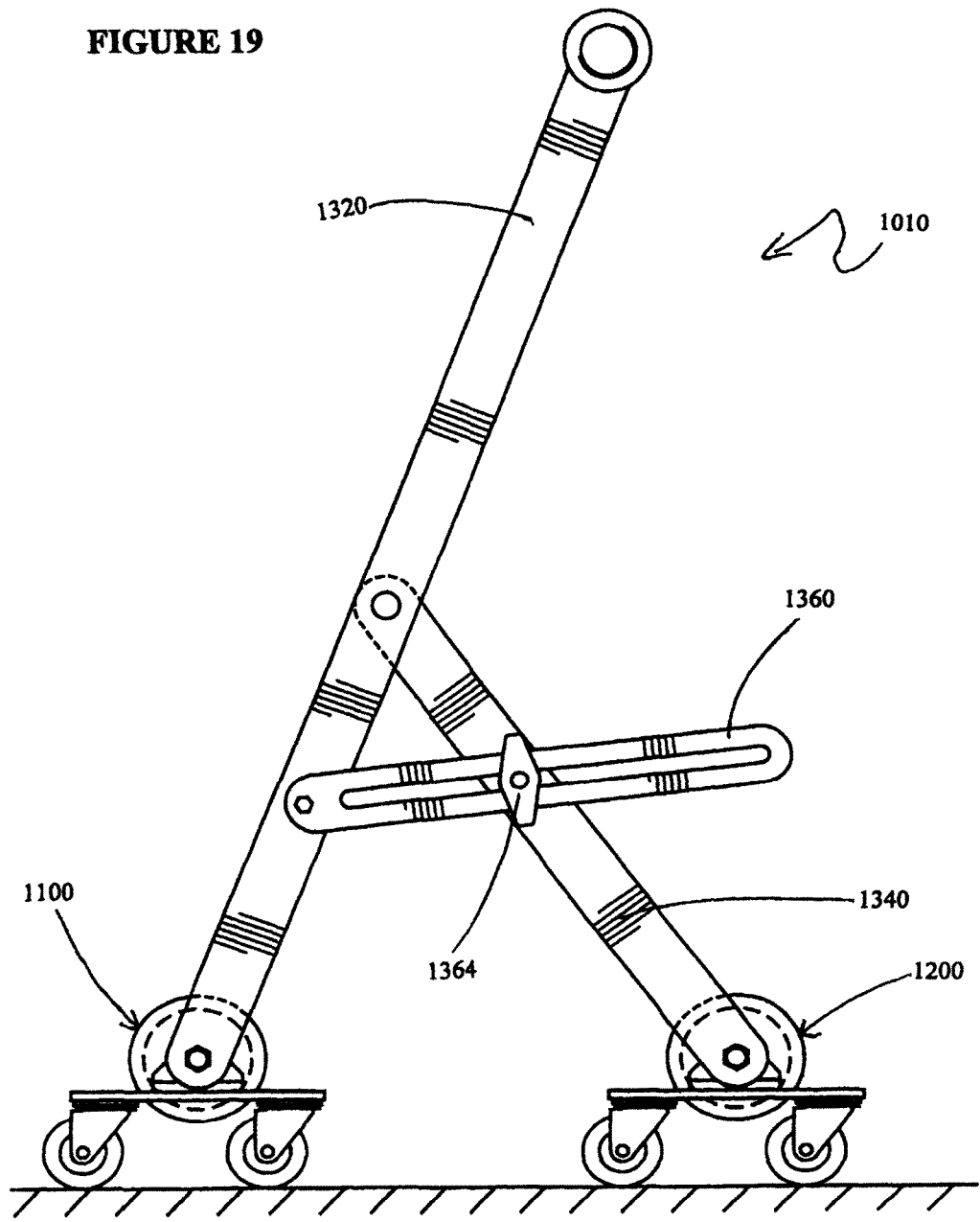
FIG. 19 is a lateral view of the apparatus shown in FIG. 17.

Reference is made to FIGS. 17 to 19 which show an apparatus 1010 in accordance with an alternative embodiment of the present invention. The apparatus 1010 is substantially identical to the apparatus 10 with a number of notable differences, including the lever arm 1320 which is provided in a single-piece construction. Furthermore, the tire engagement roller assembly 1100 provided with the apparatus 1010 has a second transverse frame bar 1190 extending between the transversely extending webs 1120 (the other web not shown) for added structural rigidity of the roller assembly 1100. The retention bar 1360 is also provided on a lateral side of the lever arm 1320 and the link arm 1340 opposed to the roller assemblies 1100, 1200. While not explicitly shown, the retention bar 1360 may be marked with a distance measurement along the elongated slot 1362 to indicate the predetermined distance between the roller assemblies 1100, 1200 based on the position of at the lock handle 1364 along the slot 1362.

I claim:

1. An apparatus for retaining and moving an automobile tire having forward and rearward end portions and generally circular interior and exterior lateral surfaces, the apparatus comprising a pair of tire engagement roller assemblies for mounting the tire thereon and a lever actuator assembly coupled to the roller assemblies for effecting relative movement thereof towards a mounting arrangement, wherein:

each said roller assembly comprises a movable base frame and a tire engaging roller rotatably coupled to the base frame along a generally horizontal rotational axis, the roller comprising first and second axial ends and an outer peripheral surface longitudinally extending between the first and second axial ends for at least partially contacting the tire, wherein the base frame is for positioning on the ground for slidable movement thereon, and wherein the respective rollers of the roller assemblies are oriented generally parallel to each other to define an inward space therebetween, and the lever actuator assembly comprises a lever arm, a link arm pivotally coupled to the lever arm, and a retention bar for selectively holding the lever arm and the link arm in the mounting arrangement, wherein the lever arm comprises first and second longitudinal lever end portions, and the link arm comprises first and second longitudinal link end portions, each said first lever and link end portions being pivotally coupled to an associated one of the roller assemblies proximal to the first axial end of the respective roller for pivoting movement along a pivoting axis oriented generally parallel to the horizontal rotational axis, and the second link end portion being pivotally coupled to the lever arm at a linking location between the first and second lever end portions, wherein the respective base frames of the roller assemblies are movable on the ground to position the respective rollers proximal to or to contact an associated one of the forward and rearward end portions of the tire, whereby the first axial ends of the rollers are proximal to the exterior lateral surface, and the tire is located in the inward space interposed between the rollers, wherein pivoting movement of the lever arm about the second lever end portion towards a generally upright orientation effects the slidable movement of one or both of the base frames inwardly towards each other to thereby mount the tire on the respective rollers in the mounting arrangement.

2. The apparatus of claim 1, wherein the apparatus is for retaining and moving the tire from the ground, wherein the pivoting movement of the lever arm about the second lever end portion towards the generally upright orientation effects the slidable movement of one or both of the base frames inwardly towards each other to thereby wedgingly displace the tire located in the inward space upwardly from the ground onto the respective rollers.

3. The apparatus of claim 1, wherein the base frame comprises a transverse frame bar and a pair of lateral frame bars each extending from an associated axial end portion of the transverse frame bar in a substantially normal orientation thereto towards the inward space, the base frame further comprising a pair of generally upwardly extending roller retention brackets coupled to an associated one of the lateral frame bars for rotatably mounting the tire engaging roller therebetween.

4. The apparatus of claim 3, wherein the tire engaging roller defines an axially open roller pin receiving bore in general alignment with the rotational axis, and each said roller retention bracket defines a roller pin receiving aperture, the tire engagement roller assembly further comprising a roller pin received through the bore and the aperture, wherein the roller pin comprises a mating end portion positioned to extend further laterally outwardly from one said bracket located proximal to the first axial end of the roller, and the first lever and link end portions each define a mating end receiving opening, the mating end portion being received through the mating end receiving opening, whereby one said bracket located proximal to the first axial end is interposed between the first axial end and the first lever or link end portion.

5. The apparatus of claim 1, wherein the tire engagement roller assembly further comprises a plurality of casters secured to the base frame for effecting the slidable movement thereof on the ground, and wherein the tire engaging roller comprises a pair of axially disposed tire stop radial flanges each extending outwardly from the outer peripheral surface to impede lateral movement of the automobile tire off the roller.

6. The apparatus of claim 1, wherein the retention bar is pivotally coupled to the lever arm between the linking location and the first lever end portion, and the lever actuator assembly further comprises a locking bolt coupled to the link arm between the first and second link end portions, the retention bar defining along a length an elongated slot for slidably receiving the locking bolt therethrough, wherein the locking bolt is operable to selectively hold the retention bar at a locking position along the elongated slot, thereby locking the link arm and the lever arm in the mounting arrangement.

7. The apparatus of claim 1, wherein a height ratio of a total height of the tire engagement roller assembly to a diameter of the tire is between about 0.05 and about 0.4, and wherein the tire engaging roller has a length between about 15 cm and about 60 cm, and the outer peripheral surface of the roller comprises a rubber material or lining for frictional engagement with a tread area of the tire, wherein in the mounting arrangement, the tire is rotatable on the rollers with counter rotation of the rollers.

8. The apparatus of claim 1, wherein the lever arm has a length between about 50 cm and about 120 cm, a length ratio between a length of the link arm and the length of the lever arm being between about 0.3 and about 0.7, and the linking location is spaced from a longitudinal end of the lever arm proximal to the first lever end portion between about 20 cm and about 50 cm.

9. The apparatus of claim 1, wherein the lever arm comprises a foldable lever arm having first and second foldable sections rotatably coupled to each other in an end-to-end orientation, the first and second foldable sections being positioned to respectively form the first and second lever end portions, and the lever actuator assembly further comprises a generally horizontal handle coupled to the second foldable section to extend laterally outwardly therefrom.

10. The apparatus of claim 1, wherein the respective tire engaging rollers of the tire engagement roller assemblies each comprise a selectively inflatable tire engaging roller operable to selectively inflate, thereby increasing a diameter of the roller to effect general vertical movement of the automobile tire in the mounting arrangement, and wherein one or both said tire engagement roller assemblies further comprise a roller actuator for selectively rotating the roller, thereby effecting relative rotation and alignment of the tire for attachment to an automobile.

11. An apparatus for retaining and moving an automobile tire having forward and rearward end portions and generally circular interior and exterior lateral surfaces, the apparatus comprising a pair of tire engagement roller assemblies for mounting the tire thereon and an actuator assembly coupled to the roller assemblies for effecting relative movement thereof towards a mounting arrangement, wherein:

each said roller assembly comprises a movable base frame and a tire engaging roller rotatably coupled to the base frame along a generally horizontal rotational axis, the roller comprising first and second axial ends and an outer peripheral surface longitudinally extending between the first and second axial ends for at least partially contacting the tire, wherein the base frame is for positioning on the ground for slidable movement thereon, and wherein the respective rollers of the roller assemblies are oriented generally parallel to each other to define an inward space therebetween, wherein the respective base frames of the roller assemblies are movable on the ground to position the respective rollers proximal to or to contact an associated one of the forward and rearward end portions of the tire, whereby the first axial ends of the rollers are proximal to the exterior lateral surface, and the tire is located in the inward space interposed between the rollers, wherein the actuator assembly is operable to effect the slidable movement of one or both of the base frames inwardly towards each other to thereby mount the tire on the respective rollers in the mounting arrangement, and wherein the tire engagement roller assembly further comprises a plurality of casters secured to the base frame for effecting the slidable movement thereof on the ground, and wherein the tire engaging roller comprises a pair of axially disposed tire stop radial flanges each extending outwardly from the outer peripheral surface to impede lateral movement of the automobile tire off the roller.

12. The apparatus of claim 11, wherein the base frame comprises a transverse frame bar and a pair of lateral frame bars each extending from an associated axial end portion of the transverse frame bar in a substantially normal orientation thereto towards the inward space, the base frame further comprising a pair of generally upwardly extending roller retention brackets coupled to an associated one of the lateral frame bars for rotatably mounting the tire engaging roller therebetween.

13. The apparatus of claim 11, wherein a height ratio of a total height of the tire engagement roller assembly to a diameter of the tire is between about 0.05 and about 0.4, and wherein the tire engaging roller has a length between about 15 cm and about 60 cm, and the outer peripheral surface of the roller comprises a rubber material or lining for frictional engagement with a tread area of the tire, wherein in the mounting arrangement, the tire is rotatable on the rollers with counter rotation of the rollers.

14. The apparatus of claim 11, wherein the respective tire engaging rollers of the tire engagement roller assemblies each comprise a selectively inflatable tire engaging roller operable to selectively inflate, thereby increasing a diameter of the roller to effect general vertical movement of the automobile tire in the mounting arrangement, and wherein one or both said tire engagement roller assemblies further comprise a roller actuator for selectively rotating the roller, thereby effecting relative rotation and alignment of the tire for attachment to an automobile.

15. The apparatus of claim 11, wherein the actuator assembly is a lever actuator assembly comprising a lever arm and a link arm pivotally coupled to the lever arm, wherein the lever arm comprises first and second longitudinal lever end portions, and the link arm comprises first and second longitudinal link end portions, each said first lever and link end portions being pivotally coupled to an associated one of the roller assemblies proximal to the first axial end of the respective roller for pivoting movement along a pivoting axis oriented generally parallel to the horizontal rotational axis, and the second link end portion being pivotally coupled to the lever arm at a linking location between the first and second lever end portions, wherein pivoting movement of the lever arm about the second lever end portion towards a generally upright orientation effects the slidable movement of one or both of the base frames inwardly towards each other to thereby mount the tire on the respective rollers in the mounting arrangement.

16. The apparatus of claim 15, wherein the apparatus is for retaining and moving the tire from the ground, wherein the pivoting movement of the lever arm about the second lever end portion towards the generally upright orientation effects the slidable movement of one or both of the base frames inwardly towards each other to thereby wedgingly displace the tire located in the inward space upwardly from the ground onto the respective rollers.

17. The apparatus of claim 16, wherein the lever actuator assembly further comprises a retention bar for selectively holding the lever arm and the link arm in the mounting arrangement, the retention bar being removably or movably coupled to the lever arm between the linking location and the first lever end portion, and the link arm between the first and second link end portions.

18. The apparatus of claim 17, wherein the retention bar is pivotally coupled to the lever arm, and the lever actuator assembly further comprises a locking bolt coupled to the link arm, the retention bar defining along a length an elongated slot for slidably receiving the locking bolt therethrough, wherein the locking bolt is operable to selectively hold the retention bar at a locking position along the elongated slot, thereby locking the link arm and the lever arm in the mounting arrangement.

19. The apparatus of claim 15, wherein the tire engaging roller defines an axially open roller pin receiving bore in general alignment with the rotational axis, and each said roller retention bracket defines a roller pin receiving aperture, the tire engagement roller assembly further comprising a roller pin received through the bore and the aperture, wherein the roller pin comprises a mating end portion positioned to extend further laterally outwardly from one said bracket located proximal to the first axial end of the roller, and the first lever and link end portions each define a mating end receiving opening, the mating end portion being received through the mating end receiving opening, whereby one said bracket located proximal to the first axial end is interposed between the first axial end and the first lever or link end portion.

20. The apparatus of claim 15, wherein the lever arm has a length between about 50 cm and about 120 cm, a length ratio between a length of the link arm and the length of the lever arm being between about 0.3 and about 0.7, and the linking location is spaced from a longitudinal end of the lever arm proximal to the first lever end portion between about 20 cm and about 50 cm.

21. The apparatus of claim 15, wherein the lever arm comprises a foldable lever arm having first and second foldable sections rotatably coupled to each other in an end-to-end orientation, the first and second foldable sections being positioned to respectively form the first and second lever end portions, and the lever actuator assembly further comprises a generally horizontal handle coupled to the second foldable section to extend laterally outwardly therefrom.

22. A process for attaching an automobile tire to an automobile, the automobile having a wheel hub provided with a lateral wheel contact surface and a plurality of wheel studs extending laterally outwardly from the surface, and the tire having forward and rearward end portions and generally circular interior and exterior lateral surfaces, wherein the tire defines a plurality of wheel stud holes for receiving the associated wheel studs therethrough, and wherein the process comprises:

providing an apparatus for retaining and moving the tire, and the tire on the ground, the apparatus comprising a pair of tire engagement roller assemblies for mounting the tire thereon and a lever actuator assembly coupled to the roller assemblies for effecting relative movement thereof towards a mounting arrangement, wherein:

each said roller assembly comprises a movable base frame and a tire engaging roller rotatably coupled to the base frame along a generally horizontal rotational axis, the roller comprising first and second axial ends and an outer peripheral surface longitudinally extending between the first and second axial ends for at least partially contacting the tire, wherein the base frame is for positioning on the ground for slidable movement thereon, and wherein the respective rollers of the roller assemblies are oriented generally parallel to each other to define an inward space therebetween, and the lever actuator assembly comprises a lever arm, a link arm pivotally coupled to the lever arm, and a retention bar for selectively holding the lever arm and the link arm in the mounting arrangement, wherein the lever arm comprises first and second longitudinal lever end portions, and the link arm comprises first and second longitudinal link end portions, each said first lever and link end portions being pivotally coupled to an associated one of the roller assemblies proximal to the first axial end of the respective roller for pivoting movement along a pivoting axis oriented generally parallel to the horizontal rotational axis, and the second link end portion being pivotally coupled to the lever arm at a linking location between the first and second lever end portions, wherein the respective base frames of the roller assemblies are movable on the ground to position the respective rollers proximal to or to contact an associated one of the forward and rearward end portions of the tire, whereby the first axial ends of the rollers are proximal to the exterior lateral surface, and the tire is located in the inward space interposed between the rollers, wherein pivoting movement of the lever arm about the second lever end portion towards a generally upright orientation effects the slidable movement of one or both of the base frames inwardly towards each other to thereby mount the tire on the respective rollers in the mounting arrangement;

moving the respective base frames of the roller assemblies on the ground to position the respective rollers proximal to or to contact an associated one of the forward and rearward end portions of the tire, whereby the first axial ends of the rollers are proximal to the exterior lateral surface, and the tire is located in the inward space between the rollers;

pivoting the lever arm about the second lever end portion towards the generally upright orientation to effect the slidable movement of one or both of the base frames inwardly towards each other, thereby wedgingly displacing the tire located in the inward space upwardly from the ground onto the respective rollers;

moving the apparatus and the tire mounted on the rollers adjacent to the automobile and proximal to the wheel hub, and rotating the tire on the rollers to align the wheel stud holes of the tire with the wheel studs of the automobile; and further moving the apparatus and the tire mounted on the rollers to receive the wheel studs through the wheel stud holes, and to at least partially contact the interior lateral surface of the tire with the wheel contact surface of the wheel hub, and threadably engaging lug nuts to the wheel studs to thereby secure the tire to the automobile.

* * * * *